US012089639B2

(12) United States Patent
Chen

(10) Patent No.: US 12,089,639 B2
(45) Date of Patent: Sep. 17, 2024

(54) LIQUID CONDUCTING COTTON ATOMIZATION UNIT

(71) Applicant: Shenzhen Huachengda Precision Industry Co. Ltd., Guangdong (CN)

(72) Inventor: Ping Chen, Guangdong (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 323 days.

(21) Appl. No.: 17/764,975

(22) PCT Filed: Sep. 15, 2020

(86) PCT No.: PCT/CN2020/115308
§ 371 (c)(1),
(2) Date: Mar. 29, 2022

(87) PCT Pub. No.: WO2022/056672
PCT Pub. Date: Mar. 24, 2022

(65) Prior Publication Data

US 2022/0346446 A1 Nov. 3, 2022

(51) Int. Cl.

| | |
|---|---|
| ***A24F 40/44*** | (2020.01) |
| ***A24F 40/10*** | (2020.01) |
| ***A24F 40/46*** | (2020.01) |
| ***A24F 40/485*** | (2020.01) |
| ***H05B 3/22*** | (2006.01) |

(52) U.S. Cl.
CPC .............. *A24F 40/44* (2020.01); *A24F 40/10* (2020.01); *A24F 40/46* (2020.01); *A24F 40/485* (2020.01); *H05B 3/22* (2013.01)

(58) Field of Classification Search
CPC .......... A24F 40/10; A24F 40/42; A24F 40/40; A24F 40/46; A24F 40/44
See application file for complete search history.

(56) References Cited

U.S. PATENT DOCUMENTS

| | | | | |
|---|---|---|---|---|
| 9,439,456 | B2 * | 9/2016 | Liu | A24F 40/46 |
| 11,517,050 | B1 * | 12/2022 | Churakov | A24F 40/44 |
| 2013/0340779 | A1 * | 12/2013 | Liu | A24F 40/44 131/329 |
| 2019/0001086 | A1 * | 1/2019 | Garthaffner | A61M 15/06 |
| 2020/0077703 | A1 * | 3/2020 | Monsalud, Jr. | A24F 40/44 |
| 2020/0214361 | A1 * | 7/2020 | Zhao | H05B 3/44 |

(Continued)

*Primary Examiner* — Truc T Nguyen

(57) ABSTRACT

A liquid conducting cotton atomization unit, including a heating member, a liquid conducting cotton and at least one supporting tube. The liquid conducting cotton is axially inserted in the heating member. The supporting tube is inserted in the liquid conducting cotton parallel to an axial direction thereof. The heating member includes a heating portion and two electrode portions respectively connected to two ends of the heating portion, the supporting tube is provided with at least one liquid outlet hole communicated with the heating portion. Liquid is conducted via the supporting tube, and is guided to the heating portion-via the liquid outlet hole, to solve the problem of high temperature and insufficient service life caused by insufficient liquid supply in center of the heating member. Meanwhile, the supporting tube can expand the outer diameter of the liquid conducting cotton, making the liquid conducting cotton fully contact with the heating member.

20 Claims, 4 Drawing Sheets

(56) References Cited

U.S. PATENT DOCUMENTS

| | | | | |
|---|---|---|---|---|
| 2021/0000177 | A1* | 1/2021 | Novak, III | H05B 1/0244 |
| 2021/0068459 | A1* | 3/2021 | Richmond | H05B 1/0297 |
| 2021/0219609 | A1* | 7/2021 | Rado | A24F 40/48 |
| 2022/0133369 | A1* | 5/2022 | Hejazi | A61B 17/80<br>606/71 |
| 2022/0400774 | A1* | 12/2022 | Jabber | A24F 7/00 |

* cited by examiner

LIQUID CONDUCTING COTTON ATOMIZATION UNIT

TECHNICAL FIELD

The present disclosure relates to the technical field of electronic cigarettes, in particular to a liquid conducting cotton atomization unit.

DESCRIPTION OF RELATED ART

With the continuous development of electronic cigarettes and the continuous innovation and progress of technology, the electronic cigarette is getting better and better in experience and more and more accepted by people. In some existing electronic cigarettes, an atomization core formed by a heating member and a liquid conducting cotton which is configured as a liquid conducting medium and disposed in the heating member is more and more liked by consumers because of its pure nature, low cost and good atomization taste. However, using the liquid conducting cotton as the liquid conducting medium also has many problems in the process of mass production, for example as follows:

1. The atomization core formed by the heating member and the liquid conducting cotton in the heating member typically feeds liquid at two ends thereof and generates heat in the center thereof, thereby the path of the liquid entering the center position of the heating member is long, resulting that the liquid supply in the center position is easy to be insufficient, and the temperature of the center position of the heating member is easy to be too high, and the liquid conducting cotton will be easy to be carbonized if it is at a high temperature for a long time and thereby affecting its service life adversely.

2. Since the liquid conducting cotton is extended in the heating member, an outer diameter of the liquid conducting cotton needs to be larger in order to make good contact between the liquid conducting cotton and the heating member. However if the outer diameter of the liquid conducting cotton is larger, it is easy to cause deformation of the heating member, and the heating member is tend to compress the cotton, resulting in insufficient liquid supply and easy scorching. Therefore, the size of liquid conducting cotton is difficult to control.

3. If the outer diameter of the liquid conducting cotton is smaller, the liquid conducting cotton is easy to be inserted into the heating member. However, a poor local contact is prone to be occurred between the liquid conducting cotton and the heating member, and the local position of the heating member not contacting the liquid conducting cotton is prone to local high-temperature scorching and thus affect the user experience.

SUMMARY OF THE DISCLOSURE

The present disclosure aims to provide a liquid conducting cotton atomization unit to improve a heating condition of a heating member.

A technical solution adopted by the present disclosure is to provide a liquid conducting cotton atomization unit, including a heating member, a liquid conducting cotton and at least one supporting tube; wherein the liquid conducting cotton is axially inserted in the heating member, and the supporting tube is inserted in the liquid conducting cotton parallel to an axial direction of the liquid conducting cotton; and wherein the heating member includes a heating portion and two electrode portions respectively connected to two ends of the heating portion; and the supporting tube is provided with at least one liquid outlet hole communicated with the heating portion.

In an embodiment, a length of the supporting tube is greater than that of the heating portion.

In an embodiment, at least one end of the supporting tube is provided with at least one liquid inlet hole.

In an embodiment, at least one end of the supporting tube forms a pointed structure via an inclined end surface.

In an embodiment, at least one end of the supporting tube extends axially and extends out of an end surface of the liquid conducting cotton.

In an embodiment, an end portion of the supporting tube extending out of the liquid conducting cotton is in a flared shape.

In an embodiment, an outer diameter of the liquid conducting cotton is smaller than an inner diameter of the heating member; and the supporting tube extends in the liquid conducting cotton and expands the liquid conducting cotton to be fully contacted with the heating member.

In an embodiment, the outer diameter of the liquid conducting cotton is larger than the inner diameter of the heating member, and the liquid conducting cotton is provided with a passage therein extending axially and extending through two opposite ends thereof; and the supporting tube extends in the passage.

In an embodiment, the heating portion is a helical structure formed by helical winding a heating wire; and two ends of the heating wire form the two electrode portions respectively.

In an embodiment, the heating member is a heating tube, a middle section of the heating tube is hollowed to form the heating portion, and two opposite ends of the heating tube form the two electrode portions respectively.

In an embodiment, a length of the liquid conducting cotton is greater than a length of the heating tube, and two opposite ends of the liquid conducting cotton extend out of the two electrode portions respectively.

In the liquid conducting cotton atomization unit of the present disclosure, the supporting tube inserted in the liquid conducting cotton is configured to conduct liquid, the liquid outlet hole in the supporting tube guides the liquid to the heating portion of the heating member to realize multi portions liquid supply to the heating member, thus solving the problem of high temperature and insufficient service life caused by insufficient liquid supply in the central portion of the heating member when used for a long time. Meanwhile, the supporting tube also plays the role of expanding the outer diameter of the liquid conducting cotton, making the liquid conducting cotton fully contact with the heating member, avoiding the problem of local high-temperature scorching caused by poor contact therebetween, and improving the structural strength of the whole atomization unit, making it difficult to deform and controllable in size, improving the consistency and reliability of the atomization unit and facilitating installation.

BRIEF DESCRIPTION OF THE DRAWINGS

The present disclosure will be further described below in conjunction with the attached drawings and embodiments, and in the drawings.

DESCRIPTION OF THE EMBODIMENTS

For better understanding of the technical features, objects and effects of the present disclosure, the specific embodiments of the present disclosure will be described in detail with reference to the accompanying drawings.

Figure 1:
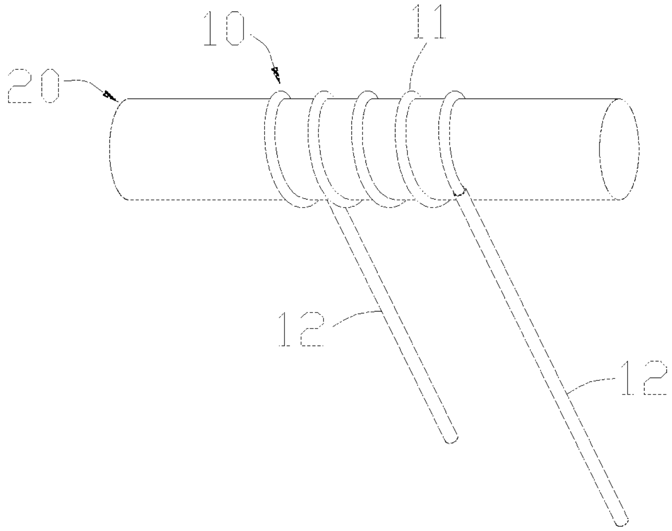
FIG. 1 is a schematic structural view of a liquid conducting cotton atomization unit according to a first embodiment of the present disclosure.
Figure 2:
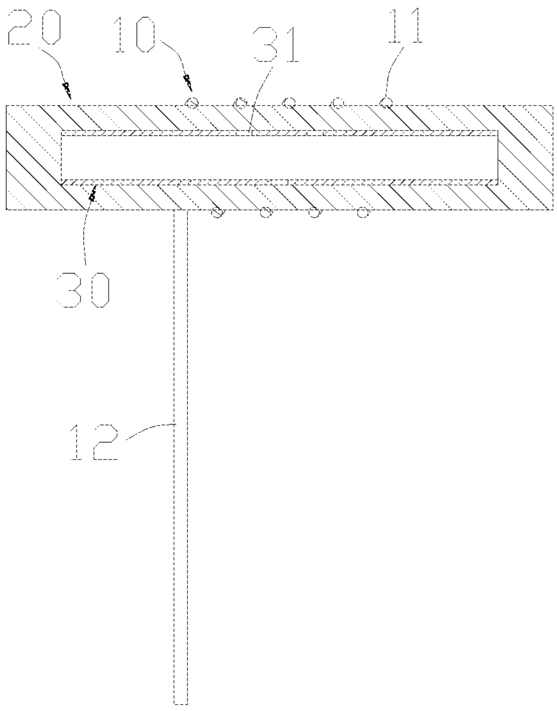
FIG. 2 is a sectional view of the liquid conducting cotton atomization unit according to the first embodiment of the present disclosure.
Figure 3:
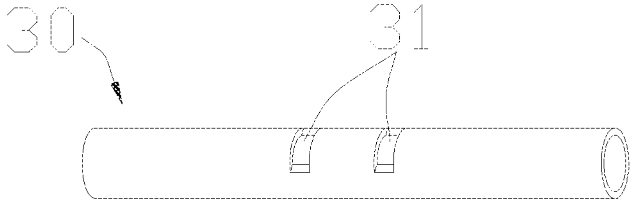
FIG. 3 is a schematic structural view of a supporting tube shown in FIG. 2.

As shown in FIGS. 1 to 3, a liquid conducting cotton atomization unit according to a first embodiment of the present disclosure includes a heating member 10, a liquid conducting cotton 20 and a supporting tube 30. The liquid conducting cotton 20 is axially inserted in the heating member 10. The supporting tube 30 is inserted in the liquid conducting cotton 20 parallel to an axial direction of the liquid conducting cotton 20. When the heating member 10 is energized and heated, a smoke liquid adsorbed in the liquid conducting cotton 20 in contact with the heating member 10 is heated and atomized to generate smoke.

The heating member 10 includes a heating portion 11 and two electrode portions 12 respectively connected to two ends of the heating portion 11. The electrode portions 12 are mainly used as positive and negative electrodes to connect an external power supply, and the heating portion 11 is mainly used to heat and atomize the smoke liquid when powered on.

An outer diameter of the liquid conducting cotton 20 is smaller than an inner diameter of the heating member 10, so that the liquid conducting cotton 20 can be easily and completely inserted into the heating member 10 without causing deformation of the heating member 10. The supporting tube 30 extends in the liquid conducting cotton 20 and enlarges the outer diameter of the liquid conducting cotton 20 to make the liquid conducting cotton 20 fully contact with the heating member 10.

In this embodiment, the heating member 10 is made of a heating wire. The heating portion 11 is a helical structure formed by spirally winding the heating wire. Two electrode portions 12 are respectively formed at two ends of the heating wire. The two electrode portions 12 extend outward perpendicular to an axial direction of the heating portion 11 respectively from two opposite ends of the heating portion 11. According to the installation needs in an electronic cigarette, the electrode portion 12 can alternatively extends outward parallel to the axial direction of the heating portion 11.

Corresponding to the structure of the heating member 10 made of the heating wire a length of liquid conducting cotton 20 is greater than that of the heating portion 11 (i.e. spiral structure). In this way, two opposite ends of the liquid conducting cotton 20 extend out of two ends of heating portion 11 respectively, which is convenient for adsorbing the smoke liquid.

Further, in this embodiment, a length of the supporting tube 30 is greater than that of the heating portion 11. The supporting tube 30 supports the liquid conducting cotton 20 to increase its outer diameter, so that the liquid conducting cotton 20 can fully contact the inner surface of the heating portion 11, so as to avoid the problem that parts of the heating portion 11 cannot contact the liquid conducting cotton 20, and meanwhile improve the structural strength of the liquid conducting cotton 20, thus to improve the structural strength of the whole atomization unit, which is conducive to the assembly and fixation of the atomization unit in the electronic cigarette.

An overall length of the supporting tube 30 is less than the length of the liquid conducting cotton 20, and the whole supporting tube 30 is embedded in the liquid conducting cotton 20. The supporting tube 30 is provided with at least one liquid outlet hole 31 corresponding to the heating portion 11. The supporting tube 30 is of a hollow structure, and two opposite ends of the supporting tube 30 are open to form two end openings. The smoke liquid can enter from the two opposite end openings of the tube, and be transmitted to the heating portion 11 through the liquid conducting cotton 20 after coming out from the liquid outlet hole 31, to be heated and atomized.

The at least one liquid outlet hole 31 can be disposed in at least one side wall of the supporting tube 30. Each side wall can be provided with one or more liquid outlet holes 31, and the shape of the liquid outlet hole 31 is not limited.

Figure 4:
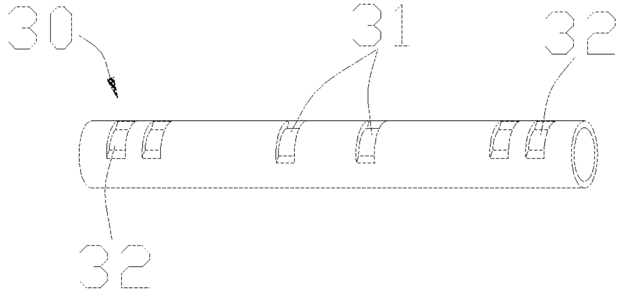
FIG. 4 is a sectional view of a liquid conducting cotton atomization according to a second embodiment of the present disclosure.

As shown in FIG. 4, in the liquid conducting cotton atomization unit of a second embodiment of the present disclosure, at least one end of the supporting tube 30 is further provided with at least one liquid inlet hole 32 as needed. In an axial direction of the supporting tube 30, the at least one liquid inlet hole 32 is located on at least one side of the at least one liquid outlet hole 31 and spaced from the at least one liquid outlet hole 31. By the arrangement of the liquid inlet hole 32, the smoke liquid adsorbed by the liquid conducting cotton 20 can enter the supporting tube 30 through the end openings of the supporting tube 30 and the liquid inlet hole 32, then flow out from the liquid outlet hole 31 to be adsorbed by the corresponding portions of the liquid conducting cotton, and then be heated and atomized by the heating portion.

Figure 5:
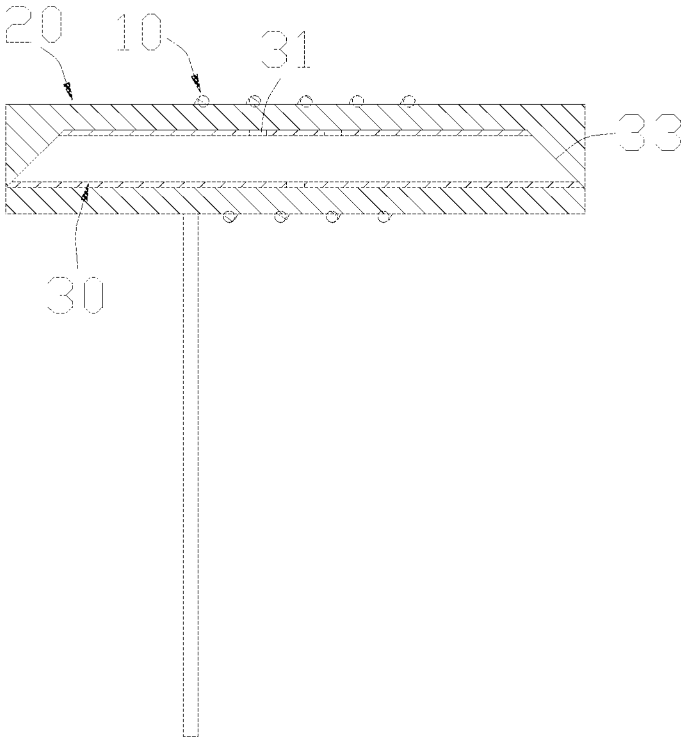
FIG. 5 is a sectional view of a liquid conducting cotton atomization according to a third embodiment of the present disclosure.

As shown in FIG. 5, a liquid conducting cotton atomization unit of a third embodiment of the present disclosure includes a heating member 10, a liquid conducting cotton 20, and a supporting tube 30. The liquid conducting cotton 20 is axially inserted in the heating member 10. The supporting tube 30 is inserted in the liquid conducting cotton 20 parallel to an axial direction of the liquid conducting cotton 20, supporting and expanding the liquid conducting cotton 20 to make it fully contact with the heating member 10. When the heating member 10 is energized and heated, the smoke liquid adsorbed in the liquid conducting cotton 20 in contact with the heating member 10 is heated and atomized to generate smoke.

In this embodiment, the heating member 10 is made of a heating wire. The arrangement of the liquid outlet hole 31 in the supporting tube 30, the arrangement of the liquid inlet hole as needed, and the specific arrangements of the heating member 10, the supporting tube 30 and the liquid conducting cotton 20, and others, can refer to the first and second embodiments described above, which will not be repeated here.

The difference of this embodiment from the above first and second embodiments is: an end surface of at least one end of the supporting tube 30 is provided with a pointed structure 33 via an inclined surface, which is facilitated to the insertion of the supporting tube 30 into the liquid conducting cotton 20, and can also enhance the introduction of smoke liquid.

Figure 6:
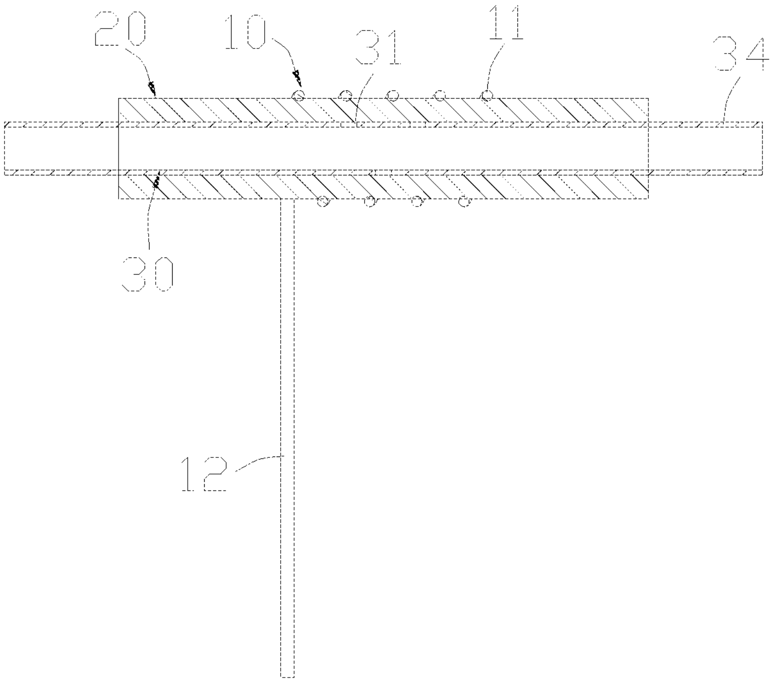
FIG. 6 is a sectional view of a liquid conducting cotton atomization according to a fourth embodiment of the present disclosure.

As shown in FIG. 6, a liquid conducting cotton atomization unit of a fourth embodiment of the present disclosure includes a heating member 10, a liquid conducting cotton 20, and a supporting tube 30. The liquid conducting cotton 20 is axially inserted in the heating member 10. The supporting tube 30 is inserted in the liquid conducting cotton 20 parallel to an axial direction of the liquid conducting cotton 20, supporting and expanding the liquid conducting cotton 20 to make it fully contact with the heating member 10. When the heating member 10 is energized and heated, the smoke liquid adsorbed in the liquid conducting cotton 20 in contact with the heating member 10 is heated and atomized to generate smoke.

The heating member 10 includes a heating portion 11 and two electrode portions 12 respectively connected to two ends of the heating portion 11. The electrode portions 12 are mainly used as positive and negative electrodes to connect an external power supply, and the heating portion 11 is mainly used to heat and atomize the smoke liquid when powered on. The supporting tube 30 is provided with at least one liquid outlet hole 31 communicated with the heating portion 11 correspondingly. The smoke liquid can enter from two opposite end openings of the supporting tube 30, come out from the liquid outlet hole 31, and then conduct to the heating portion 11 through the liquid conducting cotton 20 to be heated and atomized.

In this embodiment, the heating member 10 is made of a heating wire. A length of the supporting tube 30 is larger than that of the heating portion 11. The supporting tube 30 can support the liquid conducting cotton 20 to increase its outer diameter, so that the liquid conducting cotton 20 can fully contact the inner surface of the heating portion 11. Meanwhile, the structural strength of the liquid conducting cotton 20 can be improved, thus the structural strength of the whole atomization unit is improved, which is facilitated to the assembly and fixation of the atomization unit in the electronic cigarette.

The arrangement of the liquid outlet hole 31 in the supporting tube 30, the arrangement of the liquid inlet hole as needed, and the specific arrangements of the heating member 10, the supporting tube 30 and the liquid conducting cotton 20, and others, can refer to the first and second embodiments described above, which will not be repeated here.

Further, the difference of this embodiment from the above first and second embodiments is: the length of the supporting tube 30 is greater than that of the liquid conducting cotton 20. At least one end of the supporting tube 30 extends axially and extends out of the end surface of the liquid conducting cotton 20, so that the end opening of the supporting tube 30 is outside the liquid conducting cotton 20, which helps to conduct the smoke liquid. The smoke liquid is then adsorbed by the liquid conducting cotton 20 through the liquid outlet hole 31 in the supporting tube 30, and finally transmitted to the heating portion 11 to be heated and atomized.

In addition, the end portion 34 of the supporting tube 30 extending out of the liquid conducting cotton 20 is also convenient for cooperation with fixing parts and the like, to fix the whole atomization unit.

Figure 7:
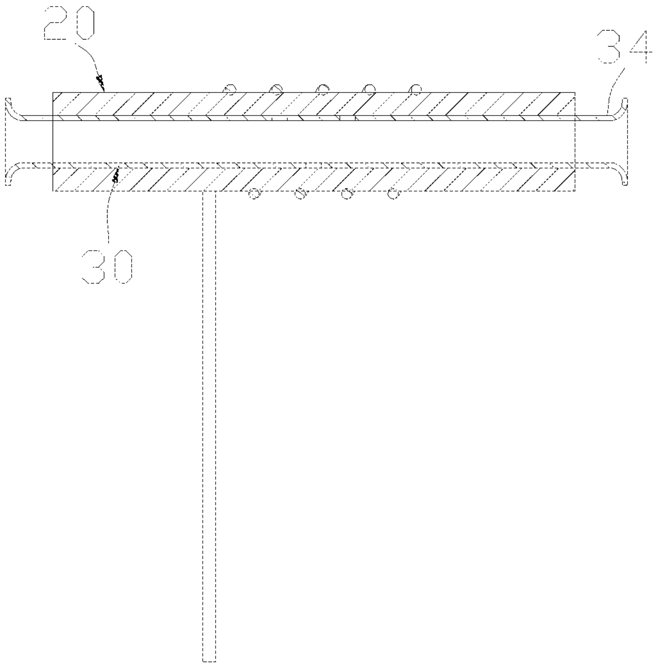
FIG. 7 is a schematic structural view of a liquid conducting cotton atomization according to a fifth embodiment of the present disclosure.

As shown in FIG. 7, in a liquid conducting cotton atomization unit of a fifth embodiment of the present disclosure, the end portion 34 of the supporting tube 30 extending out of the liquid conducting cotton 20 is flared out, as needed, to form a flared shape, so that the smoke liquid can enter the supporting tube 30 more smoothly.

Figure 8:
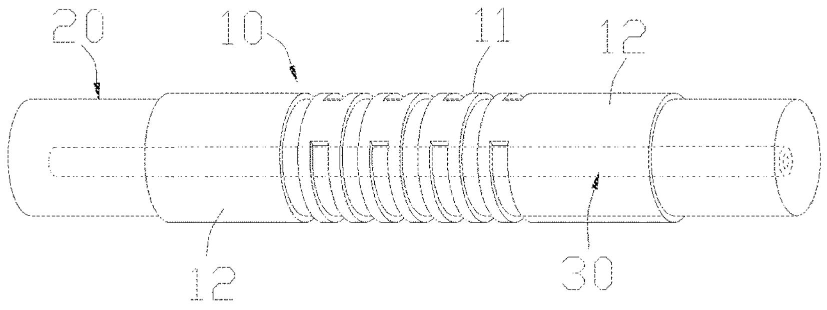
FIG. 8 is a schematic structural view of a liquid conducting cotton atomization according to a sixth embodiment of the present disclosure.
Figure 9:
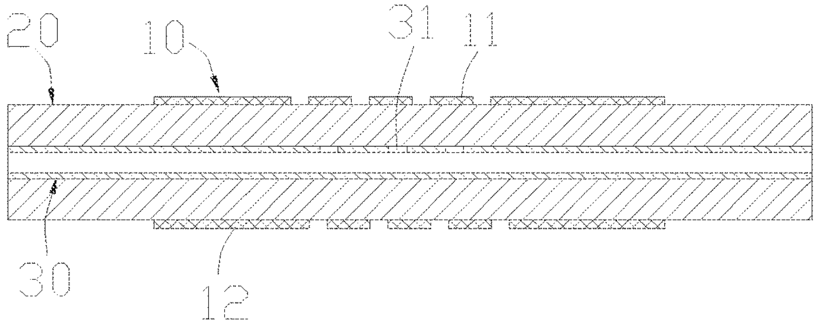
FIG. 9 is a sectional view of FIG. 8.

As shown in FIGS. 8 and 9, a liquid conducting cotton atomization unit of a sixth embodiment of the present disclosure includes a heating member 10, a liquid conducting cotton 20 and a supporting tube 30. The liquid conducting cotton 20 is axially inserted in the heating member 10. The supporting tube 30 is inserted in the liquid conducting cotton 20 parallel to an axial direction of the liquid conducting cotton 20, supporting and expanding the liquid conducting cotton 20 to make it fully contact with the heating member 10. When the heating member 10 is energized and heated, a smoke liquid adsorbed in the liquid conducting cotton 20 in contact with the heating member 10 is heated and atomized to generate smoke.

The heating member 10 includes a heating portion 11 and two electrode portions 12 respectively connected to two ends of the heating portion 11. The electrode portions 12 are mainly used as positive and negative electrodes to be connected to an external power supply, and the heating portion 11 is mainly used to heat and atomize the smoke liquid when powered on. The supporting tube 30 is provided with at least one liquid outlet hole 31 corresponding to the heating portion 11. The smoke liquid entering the supporting tube 30 can come out of the liquid outlet hole 31 and then be transmitted to the heating portion 11 through the liquid conducting cotton 20 to be heated and atomized.

In this embodiment, the heating member 10 is a heating tube, the middle section of the heating tube is hollowed out to form the heating portion 11, and two opposite ends of the heating tube form two electrode portions 12 respectively. The hollowed out arrangement of the heating portion 11 makes it possible to form a structure in which a plurality of heating rings are connected in turn, as shown in FIG. 8. The heating portion 11 can alternatively be a hollow shape in which a plurality of through holes are distributed or the like An outer diameter of the liquid conducting cotton 20 is smaller than an inner diameter of the heating member 10, so that the liquid conducting cotton 20 can be easily and completely inserted in the heating member 10 without causing deformation of the heating member 10.

A length of liquid conducting cotton 20 is larger than that of the heating tube. Two opposite ends of liquid conducting cotton 20 extend out of the two electrode portions 12 respectively, to facilitate the adsorption of the smoke liquid. The supporting tube 30 extends in the liquid conducting cotton 20, to support the liquid conducting cotton 20 to increase its outer diameter, so that the liquid conducting cotton 20 can fully contact the inner surface of the heating portion 11. Meanwhile, the structural strength of the liquid conducting cotton 20 is improved, and the structural strength of the whole atomization core is thus improved, which is more conducive to the assembly and fixation of the atomization core in the electronic cigarette. Wherein, the length of the supporting tube 30 is greater than the length of the heating portion 11, and may further be greater than the length of the whole heating tube.

Further, the structure of the supporting tube 30 in this embodiment can refer to the supporting tube 30 in the first to fifth embodiments described above, which will not be repeated here.

As in the first embodiment, the overall length of the supporting tube is less than the length of the liquid conducting cotton 20, and the supporting tube is embedded in the liquid conducting cotton 20, and one end of the supporting tube is provided with a sharp head to facilitate the insertion into the liquid conducting cotton 20. Referring to the supporting tube in the second embodiment, at least one end of the supporting tube extends out of an end of the liquid conducting cotton 20 and is bent to form a positioning portion, to effectively prevent the supporting tube from disengaging from the liquid conducting cotton 20.

Figure 10:
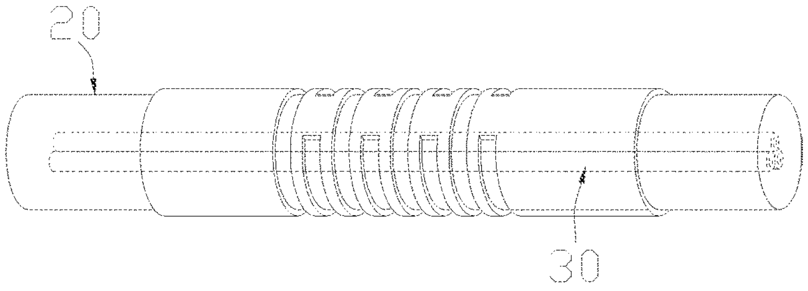
FIG. 10 is a schematic structural view of a liquid conducting cotton atomization according to a seventh embodiment of the present disclosure.

As shown in FIG. 10, a liquid conducting cotton atomization unit of a seventh embodiment of the present disclosure, which is different from the sixth embodiment, includes a plurality of supporting tubes 30. The plurality of supporting tubes 30 are arranged in parallel in an axial direction thereof and extend in the liquid conducting cotton 20.

Figure 11:
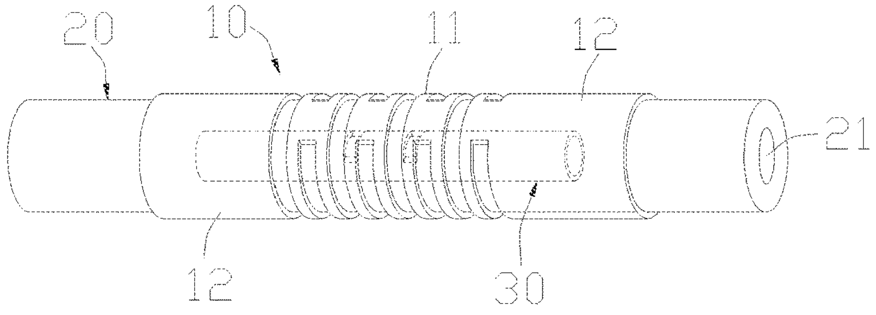
FIG. 11 is a schematic structural view of a liquid conducting cotton atomization according to an eighth embodiment of the present disclosure.

As shown in FIG. 11, a liquid conducting cotton atomization unit of an eighth embodiment of the present disclosure includes a heating member 10, a liquid conducting cotton 20, and a supporting tube 30. The liquid conducting cotton 20 is axially inserted in the heating member 10. The supporting tube 30 is inserted in the liquid conducting cotton 20 and parallel to an axial direction of the liquid conducting cotton 20, supporting and expanding the liquid conducting cotton 20 to make it fully contact with the heating member 10. When the heating member 10 is energized and heated, the smoke liquid adsorbed in the liquid conducting cotton 20 in contact with the heating member 10 is heated and atomized to generate smoke.

The heating member 10 includes a heating portion 11 and two electrode portions 12 respectively connected to two ends of the heating portion 11. The electrode portions 12 are mainly used as positive and negative electrodes to be connected to an external power supply, and the heating portion 11 is mainly used to heat and atomize the smoke liquid when powered on.

The heating member 10 can be a spiral structure made of a heating wire, or a heating tube. For details, please refer to the relevant description of the first embodiment or the seventh embodiment.

In this embodiment, an outer diameter of liquid conducting cotton 20 is greater than an inner diameter of heating member 10. In order that the liquid conducting cotton 20 can be easily and completely inserted in the heating member 10 without causing the deformation of the heating member 10, the liquid conducting cotton 20 is provided with a passage 21 extending axially and extending through two opposite ends thereof. The arrangement of the passage 21 can provide enough compression space for the liquid conducting cotton 20, so that the liquid conducting cotton 20 can be compressed to be inserted into heating member 10.

The supporting tube 30 extends in the passage 21 in the liquid conducting cotton 20, and properly expands the compressed liquid conducting cotton 20 to make it fully contact with the inner surface of the heating member 10, so as to ensure the continuous conduction of the smoke liquid in each part of the heating member 10 for heating atomization.

The liquid conducting cotton atomization unit of the present disclosure is applied to electronic cigarettes and other products, having a long service life and an improved atomization effect and an improved user experience effect.

The above embodiments illustrate only the preferred embodiments of the present disclosure, of which the description is made in a specific and detailed way, but should not be thus construed as being limiting to the scope of the claims of present disclosure. Those having ordinary skill of the art may freely make combinations of the above-described technical features and make contemplate certain variations and improvements, without departing from the idea of the present disclosure, and all these are considered within the coverage scope of the claims of the present disclosure.

What is claimed is:

1. A liquid conducting cotton atomization unit, comprising a heating member (10), a liquid conducting cotton (20) and at least one supporting tube (30); wherein the liquid conducting cotton (20) is axially inserted in the heating member (10), and the supporting tube (30) is inserted in the liquid conducting cotton (20) parallel to an axial direction of the liquid conducting cotton (20); and wherein the heating member (10) comprises a heating portion (11) and two electrode portions (12) respectively connected to two ends of the heating portion (11); and the supporting tube (30) is provided with at least one liquid outlet hole (31) communicated with the heating portion (11); the at least one liquid outlet hole (31) transmits smoke liquid entered from two opposite ends openings of the supporting tube (12) to the liquid conducting cotton (20).

2. The liquid conducting cotton atomization unit according to claim 1, wherein a length of the supporting tube (30) is greater than that of the heating portion (11).

3. The liquid conducting cotton atomization unit according to claim 1, wherein at least one end of the supporting tube (30) is provided with at least one liquid inlet hole (32).

4. The liquid conducting cotton atomization unit according to claim 1, wherein at least one end of the supporting tube forms a pointed structure via an inclined end surface.

5. The liquid conducting cotton atomization unit according to claim 1, wherein at least one end of the supporting tube (30) extends axially and extends out of an end surface of the liquid conducting cotton (20).

6. The liquid conducting cotton atomization unit according to claim 5, wherein an end portion (34) of the supporting tube (30) extending out of the liquid conducting cotton (20) is in a flared shape.

7. The liquid conducting cotton atomization unit according to claim 1, wherein an outer diameter of the liquid conducting cotton (20) is smaller than an inner diameter of the heating member (10); and the supporting tube (30) extends in the liquid conducting cotton (20) and expands the liquid conducting cotton (20) to be fully contacted with the heating member (10); or alternatively, the outer diameter of the liquid conducting cotton (20) is larger than the inner diameter of the heating member (10), and the liquid conducting cotton (20) is provided with a passage (21) therein extending axially and extending through two opposite ends thereof; and the supporting tube (30) extends in the passage (21).

8. The liquid conducting cotton atomization unit according to claim 1, wherein the heating portion (11) is a helical structure formed by helical winding a heating wire; and two ends of the heating wire form the two electrode portions (12) respectively.

9. The liquid conducting cotton atomization unit according to claim 1, wherein the heating member (10) is a heating tube, a middle section of the heating tube is hollowed to form the heating portion (11), and two opposite ends of the heating tube form the two electrode portions (12) respectively.

10. The liquid conducting cotton atomization unit according to claim 9, wherein a length of the liquid conducting cotton (20) is greater than a length of the heating tube, and two opposite ends of the liquid conducting cotton (20) extend out of the two electrode portions (12) respectively.

11. The liquid conducting cotton atomization unit according to claim 2, wherein the heating portion (11) is a helical structure formed by helical winding a heating wire; and two ends of the heating wire form the two electrode portions (12) respectively.

12. The liquid conducting cotton atomization unit according to claim 4, wherein the heating member (10) is a heating tube, a middle section of the heating tube is hollowed to form the heating portion (11), and two opposite ends of the heating tube form the two electrode portions (12) respectively.

13. The liquid conducting cotton atomization unit according to claim 5, wherein the heating portion (11) is a helical structure formed by helical winding a heating wire; and two ends of the heating wire form the two electrode portions (12) respectively.

14. The liquid conducting cotton atomization unit according to claim 7, wherein the heating portion (11) is a helical structure formed by helical winding a heating wire; and two ends of the heating wire form the two electrode portions (12) respectively.

15. The liquid conducting cotton atomization unit according to claim 2, wherein the heating member (10) is a heating tube, a middle section of the heating tube is hollowed to form the heating portion (11), and two opposite ends of the heating tube form the two electrode portions (12) respectively.

16. The liquid conducting cotton atomization unit according to claim 15, wherein a length of the liquid conducting cotton (20) is greater than a length of the heating tube, and two opposite ends of the liquid conducting cotton (20) extend out of the two electrode portions (12) respectively.

17. The liquid conducting cotton atomization unit according to claim 5, wherein the heating member (10) is a heating tube, a middle section of the heating tube is hollowed to form the heating portion (11), and two opposite ends of the heating tube form the two electrode portions (12) respectively.

18. The liquid conducting cotton atomization unit according to claim 17, wherein a length of the liquid conducting cotton (20) is greater than a length of the heating tube, and two opposite ends of the liquid conducting cotton (20) extend out of the two electrode portions (12) respectively.

19. The liquid conducting cotton atomization unit according to claim 7, wherein the heating member (10) is a heating tube, a middle section of the heating tube is hollowed to form the heating portion (11), and two opposite ends of the heating tube form the two electrode portions (12) respectively.

20. The liquid conducting cotton atomization unit according to claim 19, wherein a length of the liquid conducting cotton (20) is greater than a length of the heating tube, and two opposite ends of the liquid conducting cotton (20) extend out of the two electrode portions (12) respectively.

* * * * *